Figure 1:
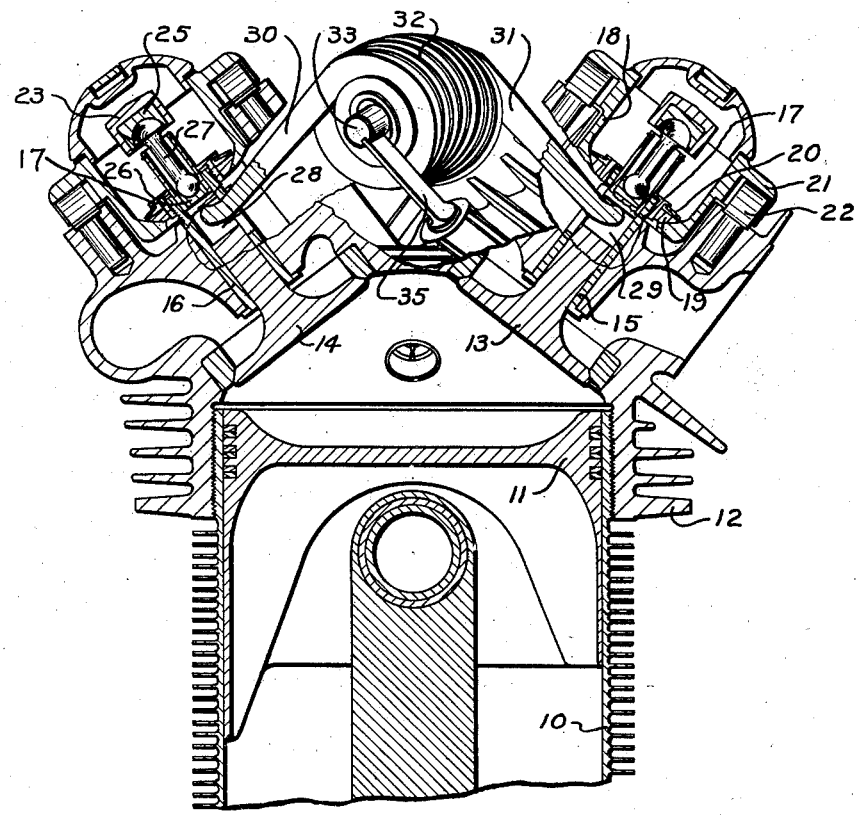

Sept. 25, 1934.  R. CHILTON  1,974,802
VALVE SPRING MECHANISM
Filed Sept. 18, 1930  3 Sheets-Sheet 1

INVENTOR.
ROLAND CHILTON
BY
ATTORNEY.

Sept. 25, 1934.   R. CHILTON   1,974,802
VALVE SPRING MECHANISM
Filed Sept. 18, 1930   3 Sheets-Sheet 2

INVENTOR.
ROLAND CHILTON
BY
ATTORNEY.

Sept. 25, 1934.  R. CHILTON  1,974,802
VALVE SPRING MECHANISM
Filed Sept. 18, 1930   3 Sheets-Sheet 3

INVENTOR.
ROLAND CHILTON
BY W. Stack
ATTORNEY.

Patented Sept. 25, 1934

1,974,802

UNITED STATES PATENT OFFICE 1,974,802

VALVE SPRING MECHANISM

Roland Chilton, Ridgewood, N. J., assignor to Wright Aeronautical Corporation, a corporation of New York Application September 18, 1930, Serial No. 482,673

5 Claims. (Cl. 123—90)

My invention relates to valve mechanism for internal combustion motors and more particularly to radial aircraft engines of the valve in the head type in which the height of the valve mechanism largely determines the over-all diameter of the engine.

The principal object of this invention is to substantially reduce the height of the valve mechanism and hence the over-all diameter of the engine. Another object is to reduce the length and weight of the valves and their operating mechanism and thus improve the high speed characteristics of the engine. A further object is to reduce the weight of the valves and their operating mechanism and hence the weight of the engine.

The conventional helical valve spring assembly surrounding the valve stem accounts for a substantial portion of the height of the valve gear and necessitates a longer and heavier stem than is otherwise desirable, thus adding to the over-all dimensions of the engine where the valves are inverted in the head, as in aircraft engine practice.

My Patent Number 1,523,583 discloses a flat laminated spring engaging a pair of valves whereby much of the height occupied by the usual helical springs is saved. In order to obtain sufficient length for such a spring between valves having a normal inclination, it is necessary to dispose the spring above the rest of the mechanism, and one of the objects of the present invention is to provide a new spring system which will involve a very minimum, if any, projection beyond the shortened valve mechanism.

Any form of valve actuating mechanism may be used in conjunction with the valve spring mechanism of this invention, the preferred form of push rods and rocker box mechanism shown being the subject of a co-pending application, Serial Number 488,704.

I accomplish these objects by the use of a helical spring having its ends extended by, or formed integral with, a pair of arms which engage in slots formed in the valve stems. In such a construction the helical coil of the spring occupies space available between the valve rocker boxes, which may now be placed close to the valve ports instead of being separated therefrom by the length of the usual valve spring assembly.

It will be seen that when one valve lifts, the movement of the associated spring arm rotates that end of the spring, the rotating motion progressively dying out toward the other end, from which the other arm engages the then stationary valve. The spring arms oscillate about the center of the spring thru a distance equal to the valve lift, and if the spring were mounted on a rigid fulcrum, the arcuate path described by the end of the arm would cause a small sliding motion at the contact between the spring arm and the valve slot. This is a difficult point to lubricate, and in the present invention sliding at this point, with consequent side pressures on the valve guides, is avoided by mounting each end of the spring on a strut having slight sidewise flexibility, thus permitting the rounded end of the spring arm to roll in the valve slot without sliding.

Referring now to the drawings in which similar parts are designated by similar numerals, Fig. 1 is a section thru the plane of the valves of a cylinder head incorporating the valve spring mechanism of the invention, with the valve spring and its supports shown in elevation.

Figure 2:
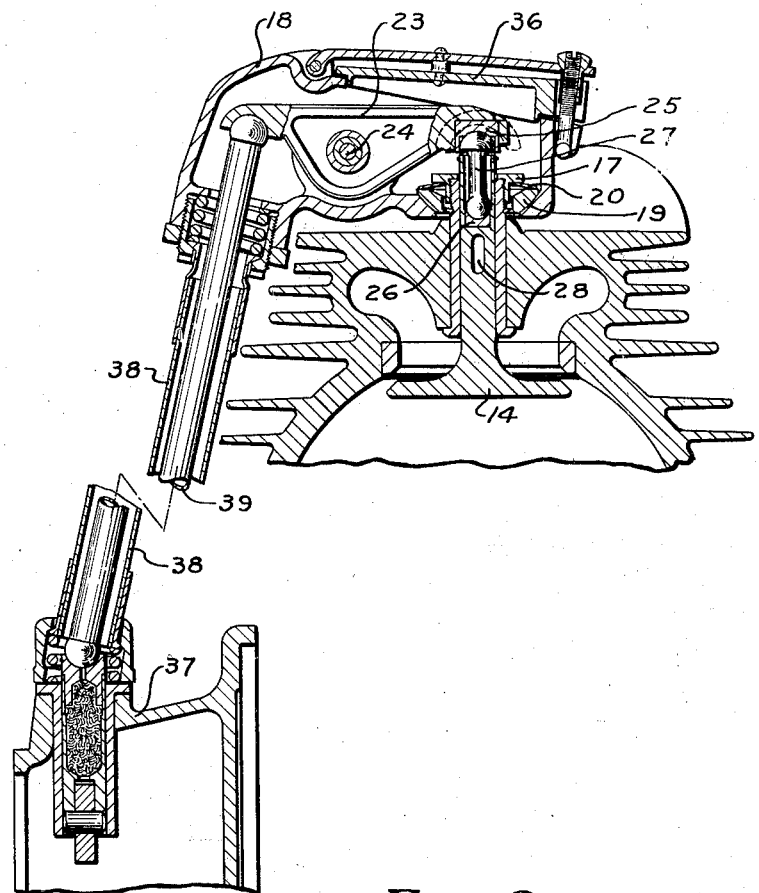
Figure 3:
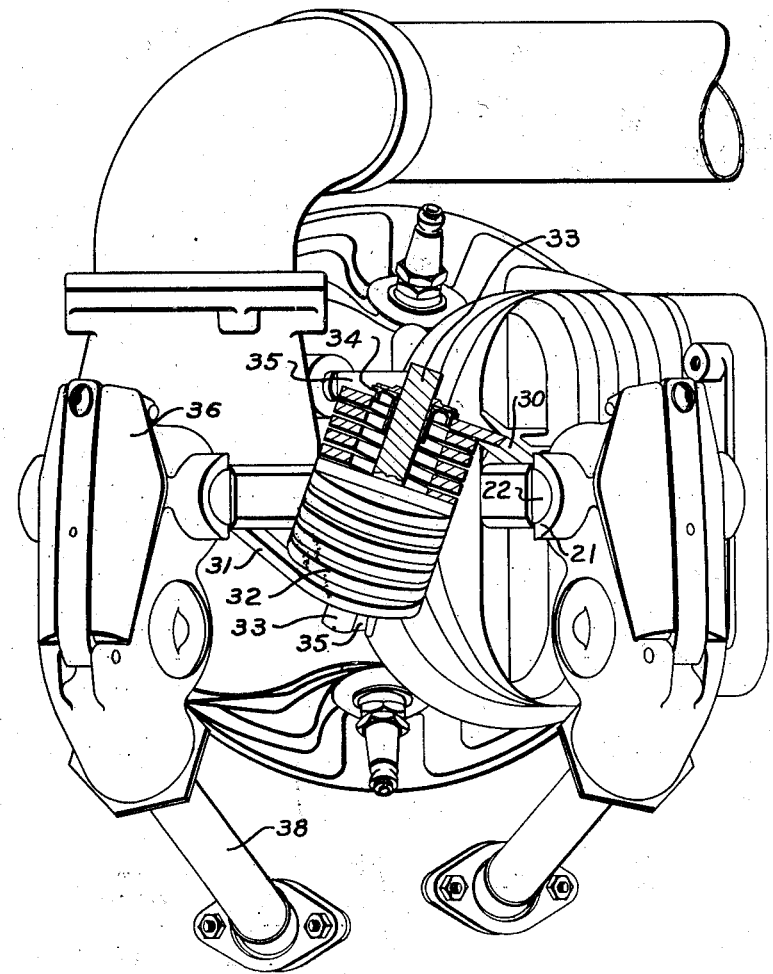

Fig. 2 is a section thru one valve and its associated rocker arm and push rod, and Fig. 3 is a plan view of the cylinder head with the valve spring in part section.

Referring first to Fig. 1, 10 represents the cylinder barrel, within which reciprocates the usual piston 11. The head 12 is screwed to the barrel in the usual way and is provided with valves 13 and 14 working in guides 15 and 16. The upper end of each guide is threaded to take the clamp nut 17 (better seen in Fig. 2) which holds down the rocker box 18 by means of the spherical seating washer 19 and the dished spring washer 20. Formed concentric with this spherical seat are the semi-cylindrical sockets 21, Fig. 1, engaging the trunnions 22 secured in, or integral with, the cylinder head.

The rocker arm 23, Fig. 2, is suitably supported on a fulcrum pin 24 in the rocker box 18 and is provided at the end over the valve with a socket 25, while a corresponding but smaller socket 26 is inserted at the bottom of the hollow portion of the stems of the valves 13 and 14. The ball-ended strut 27 cooperates with these two sockets to actuate the valve from the rocker arm.

Below the socket 26 the respective valve stems are provided with transverse slots, 28 and 29, in which are engaged the ends of the arms, 30 and 31, Fig. 1 and Fig. 3, of the coil valve spring 32. The valve guides 15 and 16 and the bosses in the cylinder head in which they are secured are provided with corresponding slots to accommodate the spring arms 30 and 31.

It will be seen in the plan view, Fig. 3, that the spring axis is inclined to the plane of the valves, and from Fig. 1 it will be clear that the axis of the spring is slightly curved so that each end of its axis is normal to the plane of the associated valve axis. The spring supporting spindle 33, Fig. 3, likewise has its ends normal to the respective valves and is provided with spring supporting bushings 34 which engage in the inner diameter of the end coils of the springs, from which the arms 30 and 31 extend. The ends of the spring supporting spindle 33 project beyond the bushings 34 and are slotted to engage flat-sectioned struts 35, Fig. 1, secured in the cylinder head. These struts comprise cantilevers having sufficient lateral flexibility to prevent sliding of the ends of the spring arms 30 and 31 at their points of contact within the slots 28 and 29 in the valve stems.

The rocker box is provided with a readily detachable cover 36 and may be connected to the crankcase 37 by a push rod housing 38, within which is disposed the usual push rod 39 which actuates the rocker arm, as set forth in complete detail in my co-pending application.

It is obvious that the new form and disposition of valve spring of this invention effects a great economy in the length of the valve stems and in the over-all height of the valve mechanism. The spring coils are accommodated in the space available between the ports of the inclined valves and accordingly do not add to the over-all height of the mechanism, as in the conventional arrangement, where the entire length of the springs must be accommodated between the rocker arm and the top of the port.

The operation of the mechanism is as follows: Assuming the valve 14 to be lifting, the valve 13 will be on its seat, and the spring arm 31 then comprises a torque arm restraining that end of the spring against rotation, the arm 30 and its associated end coil, swinging thru a small angle with the supporting bushing 34 on the end of the supporting spindle 33, the oscillating motion becoming progressively smaller in successive coils toward the restrained end. It will be obvious that a similar but reverse action occurs when the valve 13 is lifting with the valve 14 on its seat.

Since the end 33 of the supporting spindle is normal to the axis of the valve 14, it will be obvious that the end of the arm 30 will lift with the valve without inducing any side distortion of the spring, so that there is no motion of the axis of the coils. In the so-called "rat trap" springs of the prior art, one arm of the spring has been engaged with the valve, the other arm engaging a seat on the cylinder head co-axial with the same valve. In such a construction the spring is subject to a bodily sideways translation equal to one-half of the valve lift and undesirable inertia effects are developed in such floating constructions.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. Valve operating mechanism for internal combustion motors including a helical valve spring and a yielding support therefor, said valve spring having its helix axis substantially perpendicular to the axis of movement of the valve.

2. Valve operating mechanism for internal combustion motors including, in combination, two valves, a helical valve spring, a yielding valve spring support, and a connection between the opposite spring ends and the respective valves.

3. Valve operating mechanism for internal combustion motors including, in combination, two valves, a helical valve spring mounted between said valves and having its helix axis substantially perpendicular to the axes of movement of said valves, and spring arms engaging at their outer ends with said valve spring to provide therefor a yielding valve spring support.

4. Valve operating mechanism for internal combustion motors including a helical valve spring having its helix axis substantially perpendicular to the axis of movement of the valve, and means engaging in the hollow formed by the helix of said spring to provide for said spring a support.

5. In valve operating mechanism for an internal combustion engine, a cylinder head, a pair of valves in said cylinder head, a single helical spring having extensions each adapted to actuate one said valve, and a support for each end of the spring helix, each said support being organized to yieldingly hold its associated spring end for movement toward and away from the axis of the associated valve.

ROLAND CHILTON.